United States Patent
Bertet et al.

(10) Patent No.: US 8,910,540 B2
(45) Date of Patent: Dec. 16, 2014

(54) SYSTEM FOR ELECTRICALLY LOCKING A STEERING COLUMN, AND STEERING COLUMN INCLUDING SUCH A LOCKING SYSTEM

(75) Inventors: Nicolas Bertet, Tours (FR); Vincent Eymery, Lancé (FR); Alexandre Sarandao, Villerable (FR)

(73) Assignee: ZF Systemes de Direction Nacam S.A.S., Vedome (FR)

( * ) Notice: Subject to any disclaimer, the term of this patent is extended or adjusted under 35 U.S.C. 154(b) by 322 days.

(21) Appl. No.: 13/381,834

(22) PCT Filed: Jun. 28, 2010

(86) PCT No.: PCT/FR2010/051338
§ 371 (c)(1),
(2), (4) Date: Mar. 26, 2012

(87) PCT Pub. No.: WO2011/001092
PCT Pub. Date: Jan. 6, 2011

(65) Prior Publication Data
US 2012/0174695 A1    Jul. 12, 2012

(30) Foreign Application Priority Data
Jun. 30, 2009 (FR) .................................... 09 03193

(51) Int. Cl.
*B62D 1/16* (2006.01)
*B62D 1/184* (2006.01)
(52) U.S. Cl.
CPC ...................................... *B62D 1/184* (2013.01)
USPC .......................................................... 74/495

(58) Field of Classification Search
CPC ........ B62D 1/184; B62D 1/187; B62D 1/185; B62D 1/16; B62D 1/181; B62D 25/0215
USPC ................ 74/493, 494, 495; 280/775; 701/49
See application file for complete search history.

(56) References Cited

U.S. PATENT DOCUMENTS

| 4,661,752 A * | 4/1987 | Nishikawa et al. ........... 318/434 |
| 5,270,932 A * | 12/1993 | Yoshizawa et al. ............. 701/41 |
| 5,829,311 A * | 11/1998 | Roberson ......................... 74/493 |
| 7,512,470 B2 * | 3/2009 | Beneker et al. .................. 701/49 |
| 7,552,000 B2 * | 6/2009 | Beneker et al. .................. 701/49 |

(Continued)

FOREIGN PATENT DOCUMENTS

| EP | 1375296 A1 | 1/2004 |
| EP | 1531111 A1 | 5/2005 |

(Continued)

*Primary Examiner* — Justin Krause
(74) *Attorney, Agent, or Firm* — Blank Rome LLP

(57) ABSTRACT

The invention relates to an electric locking system (1) for locking the position of a steering column of a vehicle relative to the dashboard of said vehicle, the steering column including a tube-body movably mounted in a supporting assembly for enabling the manual adjustment of said steering column. The locking system includes means (2) for locking the tube-body on the supporting assembly, an electric motor (4) coupled to the locking means (2) for driving the latter and placing the steering column in an unlocked state or a locked state, motor control means providing motor actuation instructions for placing the steering column in the locked state and/or in the unlocked state, and means for detecting the state of the steering column and for generating an electric signal representative of the state of the column.

10 Claims, 6 Drawing Sheets

(56) References Cited

U.S. PATENT DOCUMENTS

2005/0263996 A1* 12/2005 Manwaring et al. .......... 280/775
2006/0005658 A1    1/2006 Armstrong et al.
2011/0167948 A1*  7/2011 Andrearczyk et al. .......... 74/493

FOREIGN PATENT DOCUMENTS

| EP | 1714849 A2 | 10/2006 |
|----|------------|---------|
| WO | 2005005230 A1 | 1/2005 |
| WO | 2008152253 A1 | 12/2008 |

* cited by examiner

SYSTEM FOR ELECTRICALLY LOCKING A STEERING COLUMN, AND STEERING COLUMN INCLUDING SUCH A LOCKING SYSTEM

REFERENCE TO RELATED APPLICATION

The present application is the U.S. national phase of PCT International Patent Application No. PCT/FR2010/051338, filed Jun. 28, 2010, published on Jan. 6, 2011, as WO 2011/001092 A2, which claims the benefit of FR 0903193, filed on Jun. 30, 2009 whose disclosures are hereby incorporated by reference in their entirety into the present disclosure.

FIELD OF THE INVENTION

The invention relates to an electric locking system for the position of a steering column of a vehicle relative to the dashboard of said vehicle.

DESCRIPTION OF RELATED ART

The electric locking system according to the invention applies to a steering column adjustable manually, either by depth and height, or by depth or height. The steering column comprises a steering shaft mounted in a mobile body-tube, the body-tube being connected to a supporting assembly to be fixed to the vehicle's chassis or to a body element.

The application of electrical locking systems to adjustable steering columns is known as such. As an example, let us quote international application WO2008/152253 and European patent application EP1531111. The systems described in these applications have, however, the disadvantage of imposing the use of a specific electronic system for the control of the steering column to be integrated into a vehicle logic controller. Its integration imposes either a modification of the existing logic controller if the resources and interfaces of the latter allow it, or the development of a specific logic controller. Moreover, the integration of the electronic control system requires the implementation of a bunch of extra cables between the related logic controller and the locking system, generating for that reason problems of integration, cost, weight and operating safety of the locking system.

Another type of electrical locking system is described in patent application EP1375296. This application covers a steering column mechanism with electric control comprising means for locking the body tube onto the supporting assembly coupled to an electric motor. The electric motor is arranged to drive the locking means into a position placing the steering column in a locked state or in an unlocked state. The mechanism is arranged to enable, once the steering column is set in the unlocked state, the adjustment of the steering column without assistance from the electric motor.

The mechanism in application EP1375296, as provided for, presents however the disadvantage of not allowing automatic detection of the state of the column, further to a specific actuation of the electric motor control means, and consequently generating appropriate actions for successful unlocking or locking of the column depending on the order given. Thus, when the driver observes that the steering column is not sufficiently unlocked or locked, he has to proceed himself to fresh manoeuvres to place the steering column in the state required. Such manoeuvres prove, furthermore, particularly dangerous when the insufficiency of the locking of the steering column is observed by the driver when the vehicle is moving.

SUMMARY OF THE INVENTION

The invention aims to remedy the problems in the prior art mentioned previously by proposing an electric locking system enabling the state of the steering column to be detected in such a way as to generate appropriate actions to reach the state ordered (locked state or unlocked state).

The invention also has the aim of proposing an electric locking system that is compact and easy to implement on the steering column.

To that end, and according to a first aspect, the invention proposes an electric locking system for the position of a vehicle's steering column relative to the dashboard of said vehicle, the steering column comprising a supporting assembly to be fixed to a vehicle chassis and a body tube movably mounted in the supporting assembly to enable manual adjustment of the position of the body-tube relative to the supporting assembly, the locking system comprising means for locking the body-tube onto the supporting assembly, an electric motor coupled to the means for locking the body-tube to drive the locking means in such a way as to place the steering column in an unlocked state or in a locked state, electric motor control means providing instructions for actuating the electric motor to place the steering column in the locked state and/or unlocked state and means for detecting the state of the steering column to emit an electric signal representative of the state of the steering column.

The presence of detection means thus enables the detection of the actual state of the steering column obtained in response to an actuation instruction given by the control means. In other words, the detection means enable the determination of whether the steering column is correctly placed in the expected state, unlocked or locked. If this is not so, depending on the electric signal emitted representative of the state detected by the detection means, the system generates instructions for actuation of the electric motor to place the column in the locked or unlocked state ordered.

Advantageously, the locking system comprises a control unit connected to the control means, to feed the electric motor in response to the actuation instructions.

Advantageously, the control unit is connected to the detection means to emit an alarm depending on the electric signal representative of the state of the steering column and of the actuation instructions.

Advantageously, the control unit is borne by the electric motor. This thus offers an autonomous locking system, able to replace a manual tightening lever and the related clamping device.

Advantageously, the means for detecting comprise a sensor and an encoder arranged on the electric motor coupled to a sensor in such a way as to detect the number of revolutions made by the electric motor.

Advantageously, the sensor is added to the control unit. This thus enables the deletion of all wire links between the electric motor and the control unit, thus favouring the compactness of the locking system, but also improving the operating safety of the control unit.

Advantageously, the sensor and the encoder are respectively a magnetic field sensor and a magnetic encoder, the magnetic encoder having at least one pair of poles attached to the electric motor.

Preferably, the locking system comprises means of the detection of the non-execution of the instructions for actuation by the electric motor. Advantageously, the means of detection of the non-execution of actuation instructions are coupled to alert means providing a sound and/or visual signal.

Advantageously, the control means are positioned on a level with a steering wheel, in such a way as to make easier its manipulation by the driver of the vehicle and thus minimise any dangerous manoeuvre on the part of said driver.

In a particularly advantageous mode of implementation, provision may be made for the locking system to comprise means for informing automatically a user, directly or by means of a logic controller, of the state of the steering column. This enables thus to provide the driver with the assurance that the state ordered for unlocking or locking has been reached.

The invention relates also to a steering column comprising a supporting assembly to be fixed to a vehicle chassis and a body-tube movably mounted in the supporting assembly to enable manual adjustment of the position of the body-tube relative to the supporting assembly, the said column comprising a locking system as described previously.

According to another aspect, the invention proposes a method for adjusting the position of a vehicle's steering column relative to the dashboard of said vehicle, the steering column comprising a supporting assembly to be fixed to a vehicle chassis and a body-tube movably mounted in the supporting assembly, the method comprising the steps consisting in i) unlocking the steering column by actuating an electric motor to place the steering column in an unlocked state, ii) adjusting manually the position of the body-tube relative to the supporting assembly, and iii) locking the steering column by actuation of an electric motor to place the steering column in a locked state, the method being characterised in that it comprises a step for detecting the state of the steering column and a step for emitting an electric signal representative of the state of the steering column.

Provision may be then advantageously made for instructions to be generated, depending on the signal emitted, for actuation of the electric motor in such a way as to place the column in the locked or unlocked state ordered.

According to a particularly advantageous mode of implementation, the adjustment method comprises a preliminary step for checking the existence of calibration parameters in the memory in a control unit of the electric motor.

Advantageously, when the existence of calibration parameters is not verified, a step may be provided for calibrating the electric motor, the calibration step consisting in determining and storing in the control unit specific data for changing from an unlocked state to a locked state of the steering column, and vice versa.

Advantageously, the specific data comprise the number of revolutions in a given direction to be gone through by the electric motor relative to a datum position to reach a given position corresponding to the unlocked state and/or locked state of the steering column.

Advantageously, the position of the electric motor characterising the unlocking of the steering column is determined from a mechanical limit stop position for the electric motor rotating in the direction corresponding to unlocking the steering column and from the number of revolutions made by the motor. "Position of the electric motor" should be understood as the number of revolutions made by the rotary shaft of said motor.

Advantageously, the electric motor is stopped automatically when it reaches the position characterising the unlocked and/or locked state of the steering column.

Advantageously, provision may be made for an automatic steering-column locking step by the control unit when the time of holding the steering column in the unlocked state exceeds a given holding time limit threshold.

BRIEF DESCRIPTION OF THE DRAWINGS

Other aims and advantages of the invention will appear during the description that follows, referencing the appended drawings, in which.

For increased clarity, identical or similar elements in the various modes of implementation are indicated by identical reference signs on all the Figures.

DETAILED DESCRIPTION OF THE PREFERRED EMBODIMENTS

Figure 1:
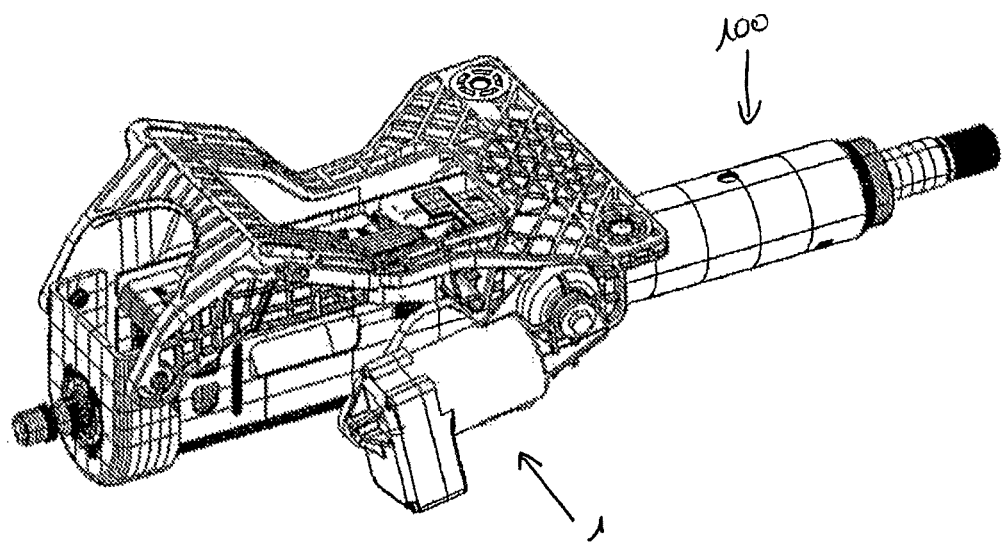
FIG. 1 shows a schematic view of a steering column fitted with an electric locking system for the position of said column according to the invention.
Figure 2:
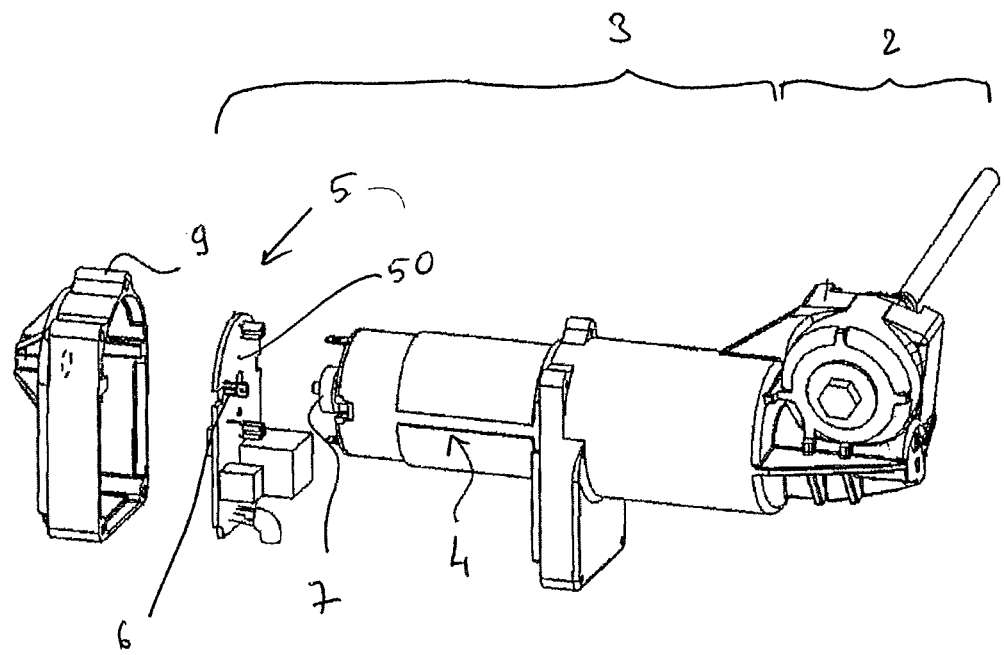
FIG. 2 shows an exploded view of the electric locking system in FIG. 1.
Figure 3:
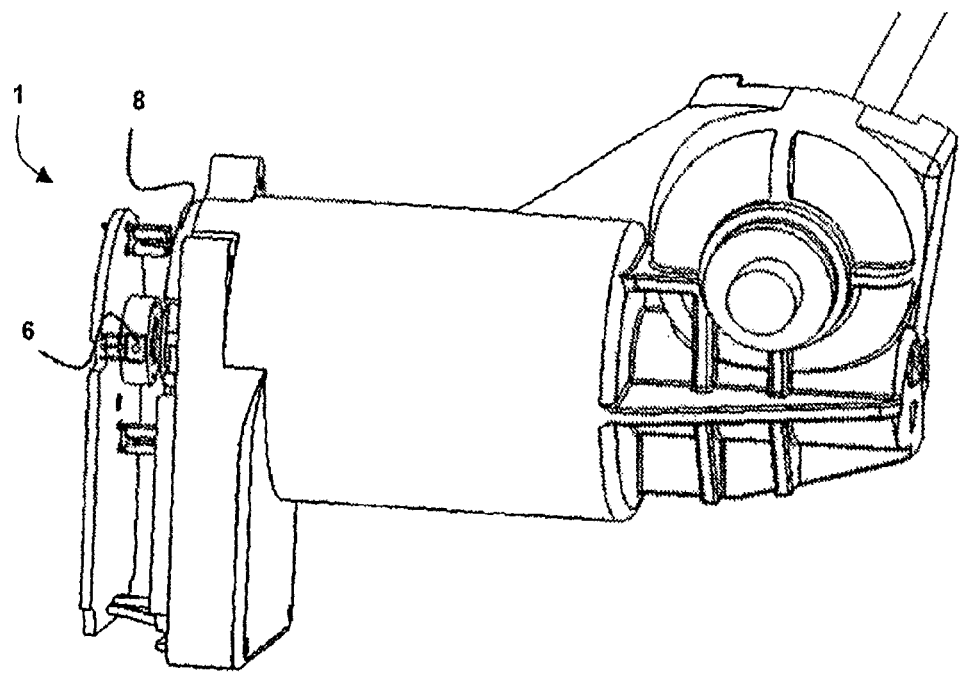
FIG. 3 shows a detailed view of the electric locking system in FIG. 2.

With respect to FIGS. 1 to 3, there is a description of an electric locking system 1 for the position of a steering column 100 for a vehicle relative to the dashboard of said vehicle. The steering column 100 comprises a supporting assembly to be fixed onto a vehicle chassis and body-tube movably mounted in the supporting assembly in such a way as to enable manual adjustment by height and/or depth of the steering column 100.

The locking system 1, illustrated on FIG. 2, comprises means for locking 2 intended to block the body-tube onto the supporting assembly of the steering column 100, electric actuation means 3 arranged to drive the locking means 2 in such a way as to place the steering column 100 in an unlocked state or in a locked state, control means 120 (not shown on FIG. 2) to control locking means 2 by means of the electric actuation means 3, plus the means for detecting the state of the steering column.

The control means 120 constituting the interface with the driver. According to a specific mode of implementation, the control means 120 consist in a pushbutton (hereunder named control button 120) or, in order to reduce the risks of pressing it inadvertently, two push buttons, preferably arranged in series. It is of course evident that the control means 120 may take a form other than that of a push button, without leaving the scope of the invention. It may, for example, be a switch, a sensor or a logic controller. It may also be high-frequency signal or a voice command.

Advantageously, the control button 120 is set on the vehicle's steering wheel. This location also provides better access and better visibility of the control button 120. In another configuration, the control button 120 may be set on a support other than the steering wheel, while remaining near the latter in such a way as to facilitate its manipulation.

Advantageously, the locking system is configured so that i) pressing the control button 120 leads to the unlocking of the steering column 100, thus enabling the manual adjustment of the latter by height and/or by depth, ii) releasing the control button 120 leads to the locking of the steering column 100, which is then locked in the position in which it was when control button 120 was released, and iii) prolonged pressing the control button 100 starts a reset of the calibration parameters. In other words, the calibration parameters are deleted. The calibration and reset cycle will be detailed further on.

Figure 4:
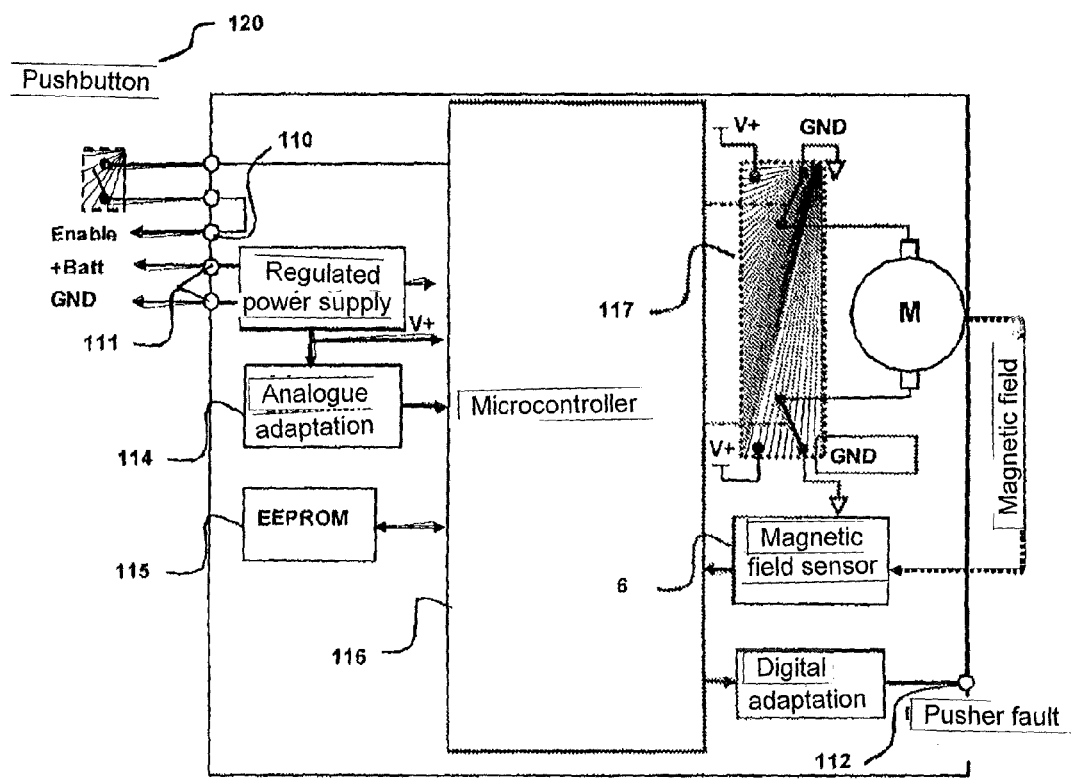
FIG. 4 shows a block diagram of the processing unit of the electric locking system in FIG. 2.
Figure 5A:
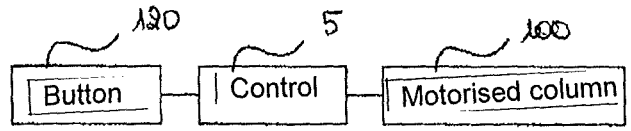
FIGS. 5a, 5b, 5c, 5d show a block diagram of the electric locking system according to the four configurations of the invention.

The electric actuation means 3 comprise on the one hand an electric motor 4 with a rotary shaft, and on the other hand a control unit 5 into which is integrated an electronic logic controller (FIGS. 4 and 5a).

In the implementation mode described, the control unit 5 is borne by the electric motor 4, by the ends of the rotary shaft of said motor.

Moreover, as will be seen further down, the electronic logic controller of the control unit 5 enables the management of three main actions: calibration of the electric motor 4, adjustment of the steering column 100, plus the execution of a programme named "fault" in the event of locking or unlocking incidents or of failure to respond to an order launched by the electronic logic controller.

Advantageously, the control unit 5 is coupled to control means 120. Thus, depending on the action exercised on the control means 120 (pressing, whether or not followed by adjustment of the steering column, releasing the pressure), they provide to control unit 5 instructions for the actuation of the electric motor 4. More specifically, depending on the action exercised on the control means 120, specific instructions are given to the processing unit 5 to the electric motor 4 which is actuated accordingly (actuation of the electric motor 4 for its calibration, actuation of the electric motor 4 to change the steering column 100 from a locked state to an unlocked state and vice versa, actuation of the electric motor 4 to manage incidents involving locking or unlocking or involving the non execution of orders from the electronic logic controller).

The control unit 5 also comprises a printed circuit board 50, an interface between the printed circuit board 50 and the control means 120 or specific modules of the vehicle, means 8 enabling the connection of the printed circuit board onto the electric motor 4, a microcontroller 116, and means for detecting the state of the steering column 100 (unlocked or locked state) following an order from the electric motor 4. The means 8 may be wired or otherwise.

Advantageously, the interface with the vehicle may be a connector or a bunch of cables directly wired onto the control unit 5.

The interface is configured so that the control unit 5 receives, from the vehicle, input signals relating to authorisation for the adjustment of the steering column 100 and to the autonomous power supply to the electric locking system 1.

Advantageously, the adjustment authorisation for the steering column 100 is characterised by a signal named "enable", as illustrated on FIG. 4. The input 110 of the "enable" signal is connected to the control unit 5. Provision may, however, be made, as illustrated on FIG. 4, for the input 110 of this signal to be also connected to the control button 120. Thus, when the "enable" signal is active, pressing the control button 120 is detected by the control unit 5, the latter being fed at that time. When the "enable" signal is inactive, pressing the control button 120 does not generate any action from the control unit 5, which is not receiving its power supply at that time. Consumption is therefore nil, leakage current notwithstanding.

The autonomous power supply to the locking system 1 is characterised by the "+Batt" (or "battery") and "GND" 111 signals. In a specific configuration, the voltage is supplied permanently and directly by the vehicle's battery.

Provision may also be made for the interface to also be configured for the control unit 5 to provide the vehicle with an output signal related to the locking and unlocking incidents of the steering column 100 and/or to the non-execution of an order from the control unit 5. The locking/unlocking incidents of the steering column 100, plus the non-execution of an order, are advantageously characterised by a signal named "fault" shown on FIG. 4 (signal given by the printed circuit on output 112).

Advantageously, the control unit 5 is connected to alert means enabling the user to be alerted to locking/unlocking incidents and/or to non-execution of an order by the electric motor 4. The alert means consist for example of an indicator light, such as a light-emitting diode placed on the dashboard or integrated into the control button 120 and/or a device enabling the emission of a sound signal. The alert may also be given by means of an error message displayed on the screen of an on-board computer in the vehicle.

As for the means for detecting, they are arranged to emit an electric signal representative of the locked state and/or unlocked state of the steering column 100.

In the following, the detection means comprise a magnetic field sensor 6 and a magnetic encoder 7 with N pairs of poles and attached to the end of the rotary shaft of the electric motor 4 on which the control unit 5 is borne. It is of course evident that other suitable types of sensors, and thus of encoders, may be used without leaving the scope of the invention. In particular, the sensors used may be, for example, of the Hall-effect, magnetoresistive, angular or infrared type.

Sensor 6 is arranged with the magnetic encoder 7 in such a way as to detect an electric pulse corresponding to each of the poles passing in front of the magnetic field sensor 6. In the mode of implementation described, the magnetic field sensor 6 is put on the control unit 5. The advantage of this configuration is to enable improved mechatronic integration and the deletion of all wire connections between the electric motor 4 and the printed circuit board, reducing thus the cost of manufacturing the locking system 1 but also improving the operating safety of the control unit 5.

As for the microcontroller 116, it includes the software managing the control strategy of the electric motor, the control of the electric motor 4, the acquisition of the signal emitted by the magnetic field sensor 6 on each of the pulses recorded when the poles of the magnetic encoder 7 pass, the adaptation strategy as a function of the power supply voltage and the control of the output of the "fault" signal.

The microcontroller 116 also controls advantageously the power supply to the control unit. Thus, the microcontroller may order that its own power supply be cut off when the programme related to the unlocking/locking of the steering column, managed by the microcontroller 116, has been executed. This enables thus the electric consumption to be limited to just the leakage current when the control unit 5 is not operating. Only pressing the control button 120 will be able to enable the initialisation of a new motor control cycle and therefore a new power supply to the control unit. This is because, if the "enable" signal is present, the microcontroller 116 is fed temporarily when the control button 120 is pressed. It then actuates the regulator such that power supply regulation is actuated. The regulator then provides the energy necessary for the components on the printed circuit board via the Battery module related to the "battery" signal. The power supply is from then dissociated from the control button 120.

As we will see further on, the operation of the electric locking system 1 is based on parameters for the calibration of the motor stored beforehand in an EEPROM type memory 115 in the control unit. Writing the calibration parameters in the memory 115, reading them and deleting them is done by the microcontroller 116. In the configuration required, the memory 115 may be a component connected to or integrated into the microcontroller 116.

In one advantageous configuration, the power supply to the control unit 5 is regulated. To do this, control unit 5 comprises means enabling the "battery" voltage to be adapted according to the requirements of the various components in the control unit such as the microcontroller 116. The means for adapting the "battery" voltage are, for example, a voltage regulator combined with filter components.

Advantageously, the control unit 5 comprises an analogue adapter 114 enabling the "battery" voltage to be adapted in such a way as for the microcontroller 116 to be able to detect a variation in the voltage of the power supply to the electric motor 4 and adapt its control strategy as a function of this parameter (protection of inputs/outputs of the printed circuit board, management of motor inertia, etc.). In other words, the analogue adapter 114 gives an image of the voltage of the power supply to the motor within a range of variation that can be read by the microcontroller 116.

Advantageously, the power supply, breaking, plus the reversal of the polarity of the electric motor 4 enabling the change in its rotation direction, are obtained by means of an H bridge (reference 117 on FIG. 4).

Advantageously, the electric motor 4 is coupled to the locking means 2 of the body-tube using means for transmitting the motion of rotation of the electric motor 4.

Figure 6:
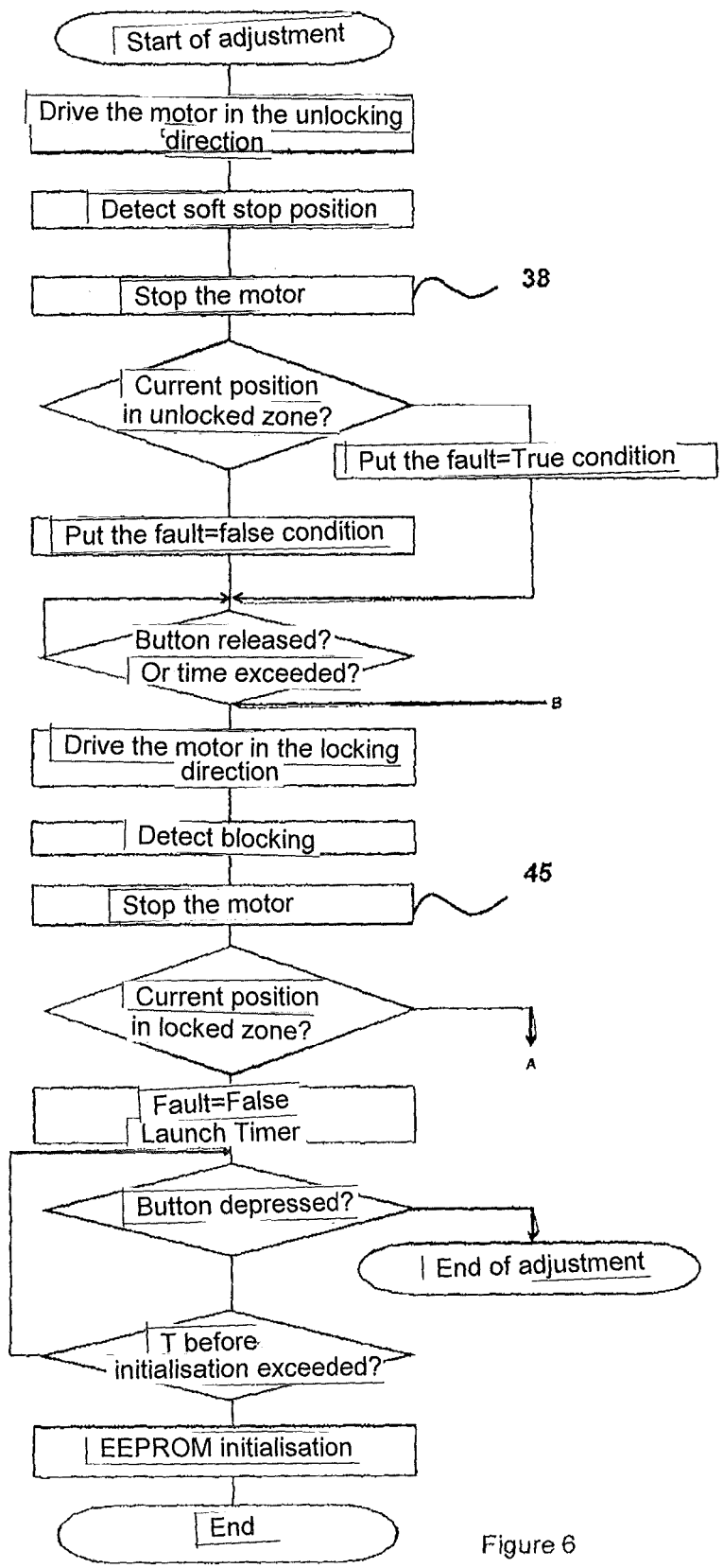
FIG. 6 shows a flow chart relative to the adjustment operation for the steering column.

The steering column 100 is adjusted according the following general principle, also shown on FIG. 6.

When the control button 120 is pressed, the electric motor 4 is actuated in the direction related to unlocking the steering column 100, driving, when it rotates, the locking means 2 in such a way as to release the tension exercised by the locking means on the steering column. The steering column 100 is then unlocked. One may proceed to the manual adjustment of the column.

When the control button 120 is released, the electric motor 4 is actuated in the opposite direction, driving, when it rotates, the locking means 2 in such a way as to apply again a tension between the locking means 2 and the steering column 100. The steering column 100 locked, its adjustment is then impossible.

The tension applied by the locking means 2 to the steering column 100, and thus the conformance of the locking or unlocking is linked directly to the number of revolutions made by the electric motor. This datum is obtained thanks to the detection means, that is the magnetic encoder 7 and the magnetic field sensor 6 put on the electric motor 4 and the control unit 5 respectively. This is because, when the motor is actuated, the magnetic encoder 7 with N pairs of poles, attached to the motor's rotary shaft, turns in front of the magnetic field sensor borne by the control unit 5. The microcontroller 116, that picks up the number of pulses detected by the sensor, then determines the number of revolutions made by the electric motor 4, it being considered that N pulses correspond to one motor revolution.

Unlocking or locking the steering column 100 is done therefore according to a specific type of control of the electric motor 4 by means of actuation of the control means 120.

In one advantageous configuration, provision is made, prior to the actuation of the electric motor 4 by the control means 120, for the logic controller of the control unit 5 to proceed to a verification step for the existence of calibration parameters of the electric motor 4 registered in the memory 115 of the control unit 5.

If the existence of calibration parameters in memory 115 is verified, the control unit 5 authorises the operations enabling the change from the locked state to the unlocked state of the steering column 100. On the other hand, if the existence of calibration parameters is not verified, the control unit 5 actuates the calibration of the electric motor 4. This operation will be described further on.

To change the steering column 100 from the locked state to the unlocked state, the control unit 5 controls the electric motor 4 in such a way as to drive it to rotate in the direction corresponding to unlocking steering column 100. The electric motor 4 then runs until it reaches a position called "soft stop". It characterises the optimal position for which the control unit 5 must give the order to no longer feed the electric motor 4. It constitutes one of the calibration parameters for the electric motor 4. It corresponds therefore, as we will see further on, to a position determined during a prior step for calibrating the electric motor 4.

When the control unit 5 detects that the "soft" position of the electric motor 4 has been reached, the motor's power supply is cut off.

After having chosen the position of the steering column 100, the user releases the control button 120. This action then generates the order for the electric motor 4 to be rotated by the unit in the direction opposite to the direction corresponding to unlocking the steering column 100 (direction corresponding to locking the steering column 100). The electric motor 4 then runs until it reaches a position known as "locked". This position also constitutes a parameter for calibrating the electric motor 4. It corresponds therefore, as we will see further on, to a position determined during a prior step for calibrating the electric motor 4.

When the control unit 5 detects that the "locked" position of the electric motor 4 has been reached, the motor's power supply is cut off.

In the specific case of steering columns locked by a rack system, it proves necessary to perform checking operations to make sure that the steering column 100 is completely unlocked or locked depending on the order given. This is because, the steering column 100 is in a correctly locked state when the toothed elements of the rack locking system are positioned in such a way as for the teeth to imbricate together and in a correctly unlocked state when the teeth on each of the elements in the locking system are no longer in contact. On the contrary, the steering column 100 is in an incorrectly locked state when the toothed elements of the rack locking system are positioned in such a way as for the teeth to overlap. We then talk of a "teeth-on-teeth" position. For steering columns locked by a rack system, provision is therefore made for there to be extra calibration parameters related to an "unlocked zone" and a "locked zone" corresponding to a zone where the steering column 100 is completely unlocked and a zone where the steering column 100 is completely locked respectively.

The unlocked and locked zones are zones between respectively a first predefined position specific to a steering column and the mechanical unlocking limit blocking position on the one hand, and between a second predefined position, also specific to the steering column, and the mechanical limit blocking position on the other hand.

Thus, following a column unlocking order given, the control unit proceeds, after the motor has stopped (step 38), to verification whereby the steering column 100 is actually unlocked, i.e. checking whether the current position of the column is actually in the unlocked zone stored in the memory.

If this is so, the "fault" variable is forced onto "false". Otherwise, the "fault" variable is forced onto "true", i.e. the unlocking cycle is reset.

Similarly, following a order given for locking the steering column, the control unit 5 proceeds, after the motor has been stopped (step 45), to verification whereby the steering column 100 is actually locked, i.e. checking whether the current position of the column is actually in the locked zone 30 stored in the memory. If this is so, the "fault" variable is forced onto "false". On the other hand, if the current position of the steering column 100 is not within the locked zone, a "teeth-on-teeth" management procedure is actuated.

Figure 8:
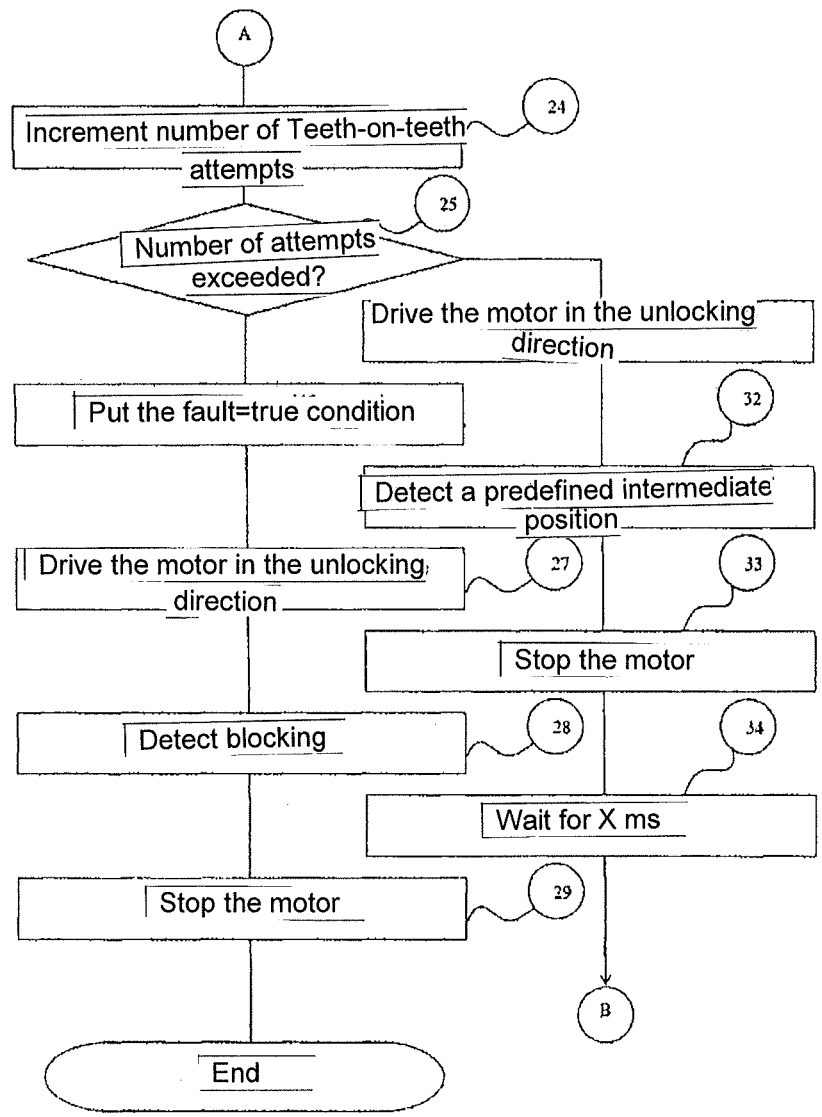
FIG. 8 shows a flow chart relative to the procedure for managing the teeth-on-teeth for adjustment in the case of a rack and pinion steering column.

The "teeth-on-teeth" management procedure, shown on the diagram in FIG. 8, consists in successive attempts to bring the steering column 100 to position itself in the locked zone. More specifically, the control unit 5 is going to proceed to ordering several attempts at unlocking then locking the steering column 100 without an intervention by the user being necessary. Advantageously, the number of attempts will be three. On each attempt, a related meter is incremented (step 24). Between each attempt, a time delay between 0 and 3 seconds may be provided.

As long as the number of attempts authorised is not exceeded, the order unlocks the steering column 100 up to a predetermined intermediate position (step 32), stops the motor (step 33), waits for a predefined time (step 34) then resumes the normal locking cycle (FIG. 6) until locking is correct. The choice of unlocking the steering column 100 only up to an intermediate position enables the time for the attempts to be reduced.

If the number of attempts authorised is reached (step 25), without a correct locking operation having been performed, the "fault" variable is forced onto true. The motor is then controlled by the control unit 5 in the unlocking direction (step 27) until it is blocked on the mechanical limit stop (step 28), then its power supply is cut off (step 29). The stop positions are not saved, and the system is considered as non calibrated. The adjustment operation for the steering column 100 is not then authorised.

The management of "teeth-on-teeth" may also consist in a steering column unlocking step which will be followed by a new attempt at locking when a new change in the state of the actuation signal is generated (for example by the control means 120). This also enables the driver to move the steering wheel and thus to leave the "teeth-on-teeth" zone.

Advantageously, provision may be made for automatic deactuation of the control button 120 of the electric motor 4 after a certain time, predefined and registered in the memory 115 of the control unit 5. The steering column 100 will not be able to remain unlocked, even in the case of the control button 120 remaining depressed when the user is no longer pressing it.

Figure 7:
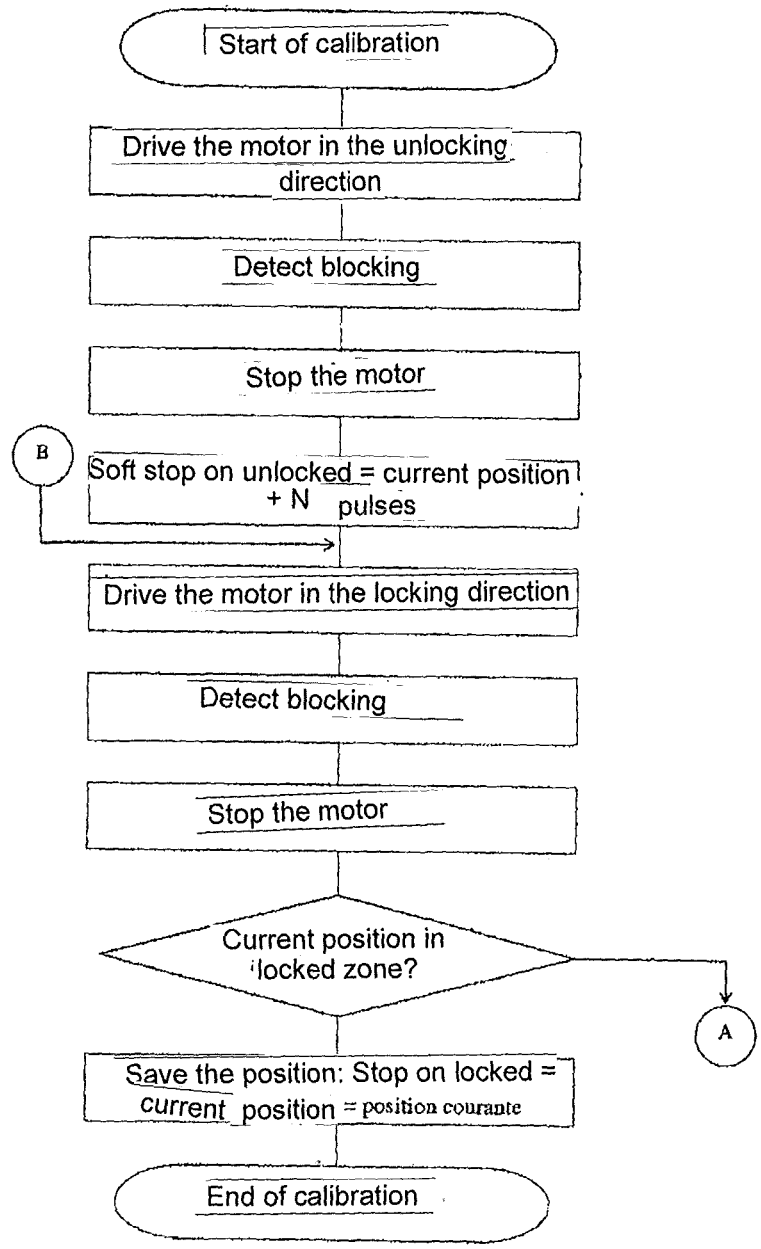
FIG. 7 shows a flow chart relative to the calibration operation for the steering column.

The calibration step for the electric motor 4, shown on the diagram in FIG. 7, consists in determining and storing in the control unit 5 specific data to which the electric motor 4 must respond, depending on whether the column changes from a locked state to an unlocked state or vice versa. These data constitute the calibration parameters for the electric motor 4.

The calibration parameters comprise, in particular but not exclusively, the "soft stop" position, the locked position, the unlocking and locking zones when the steering column 100 is a rack column.

For calibration to start, it is necessary to fulfil calibration conditions. The calibration conditions comprise pressing the control button 120 at least once during a defined time, a power supply voltage for the electric motor 4 within a defined range, the absence of calibration parameters such that the current position of the steering column, the number of pulses corresponding to the "soft stops" saved in the memory 115 of the control unit 5.

Once the calibration conditions are fulfilled, the first manoeuvre in the calibration cycle consists in determining the position of the "soft stop". The "soft stop" position is quantified by a number of pulses. It corresponds to the position for which the electric motor 4 is blocked mechanically at the end of complete travel plus a number N of pulses. The number N of pulses is determined according to several criteria, and in particular the power supply voltage and inertia of the motor. The number N is permanently updated as a function of the variation of these criteria. To do this, the electric motor 4 is always stopped before reaching the mechanical block at the end of travel. This enables thus the avoidance of a motor shock occurring, and consequently the avoidance of the noise caused by such a shock.

The "soft stop" position is determined in the following manner. The electric motor 4 is controlled by the control unit 5 in a direction corresponding to unlocking the steering column 100 and this is done until the motor stops at the mechanical limit stop. When the electric motor 4 reaches the mechanical limit stop, the sensor records no more pulses relating to the poles of the passage of the magnetic encoder 7 in front of the sensor when the motor is still receiving its power supply. The "soft stop" is then deduced and saved in the memory 115 of control unit 5.

The second manoeuvre in the calibration cycle consists of determining the position for locking the steering column 100.

To do this, the electric motor 4 is driven by the control unit 5 in the direction corresponding to locking until the motor is stopped by being blocked. The control unit 5, detecting the blocking of the electric motor 4, cuts off the motor's power supply. Blocking the electric motor 4 corresponds, in steering columns other than rack columns, to the arrival at the end of motor travel. This end-of-travel position corresponds to optimal locking of the steering column 100. The end-of-travel position thus determined is then saved in the memory 115 of the control unit 5.

Blocking the electric motor 4 may however occur, in the case of steering columns locked by a rack system when the elements in the rack locking system are positioned teeth-on-teeth. In this case, although the electric motor 4 is blocked, the steering column 100 is not locked. It is therefore necessary, for such steering columns, to define the locking zone in which locking the steering column 100 is guaranteed.

It is therefore necessary, in the case of steering columns locked by a rack system, to check whether the steering column 100 is actually locked, that is to check whether the current position of the steering column 100 is in the locking zone. If such is the case, the current position is saved and the calibration is considered as completed. On the other hand, if the current position after blocking the electric motor 4 is outside the locked zone, the procedure for managing "teeth-on-teeth" described previously is actuated.

Figure 5B:
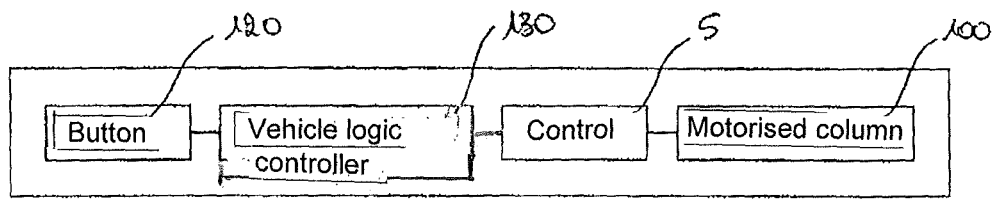
Figure 5C:
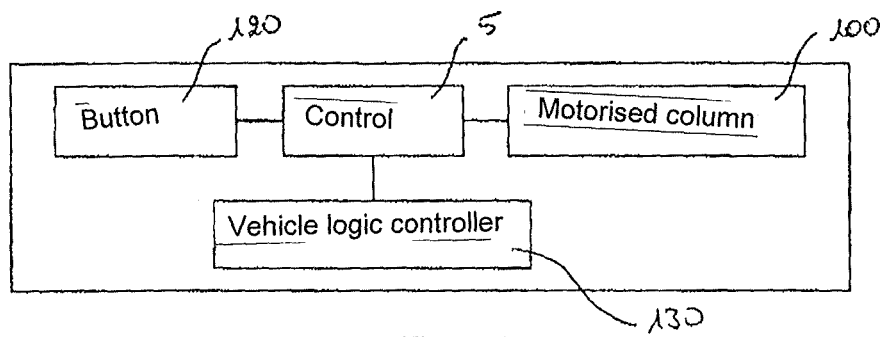
Figure 5D:
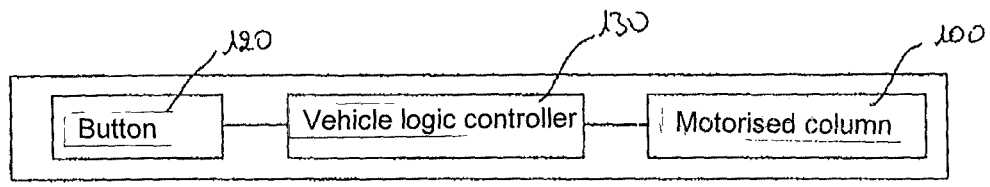

In the example of electric locking system 1 described previously, the electronic logic controller is integrated into the control unit 5 (FIG. 5a). Provision may, however, be made, as illustrated by FIGS. 5b, 5c and 5d, for an electric adjustment system 1 whose control unit 5 is associated with an already existing electronic logic controller 130 of the vehicle (logic controllers for the vehicle's air conditioning, power steering, etc.). Depending on the case, it may be advantageous to provide an existing electronic logic controller 130 arranged in such a way as to link the control means 120 to the control unit 5 (FIG. 5b). In another configuration, the system may not include control unit 5 as described previously. The vehicle's existing electronic logic controller will then be arranged in such a way as to link the control means 120 to the steering column 100 (FIG. 5*d*).

Moreover, the locking means 2 will be able to be advantageously of the type of those described in the international application WO2008/152253.

Advantageously, the locking system may include means for communicating by CAN, LIN or similar protocol enabling the system to communicate with other logic controllers in the vehicle.

Advantageously, provision may be made for a continuous power supply to the locking system in such a way as to enable adjustment not only when the vehicle is stopped, but also when the vehicle is moving.

The invention is described above as an example. It should be noted that the persons skilled in the art can make various alternate embodiments of the invention without leaving the scope of the invention.

The invention claimed is:

1. Electric clamping system for the position of a steering column of a vehicle relative to the dashboard of said vehicle, the steering column comprising a supporting assembly to be fixed to a vehicle chassis and a body-tube movably mounted in the supporting assembly to enable manual adjustment of the position of the body-tube-relative to the supporting assembly, the clamping system comprising:
   means for clamping the body-tube onto the supporting assembly through mechanical action,
   an electric motor coupled to the means for clamping the body-tube to drive the means for clamping in such a way as to place the steering column in an unclamped state or in a clamped state,
   means for controlling the electric motor, providing instructions for an actuation of the electric motor to place the steering column in a clamped state and/or an unclamped state,
   means for detecting the state of the steering column for emitting an electric signal representative of the state of the steering column,
   characterised in that, furthermore, the clamping system is configured to be able to detect the non-execution of the clamping instructions by the electric motor.

2. Electric clamping system for the position of a steering column according to claim 1, characterised in that the electric clamping system comprises furthermore a control unit connected to the means for controlling, to power the electric motor in response to the actuation instructions.

3. Electric clamping system for the position of a steering column according to claim 2, characterised in that the control unit is connected to the means for detecting to emit an alarm depending on the electric signal representative of the state of the steering column and actuation instructions.

4. Electric clamping system for the position of a steering column according to claim 2, characterised in that the control unit is on the electric motor.

5. Electric clamping system for the position of a steering column according to claim 1, characterised in that the means for detecting comprise an encoder arranged on the electric motor coupled to a sensor in such a way as to detect the number of revolutions made by the electric motor.

6. Electric clamping system for the position of a steering column according to claim 5, characterised in that the sensor is arranged on a control unit.

7. Electric clamping system for the position of a steering column according to claim 5, characterised in that the sensor and the encoder are respectively a magnetic field sensor and a magnetic encoder, the magnetic encoder having at least one pair of poles attached to the electric motor.

8. Electric clamping system for the position of a steering column according to claim 1, characterised in that the said means for detecting are coupled to alert means giving a sound and/or visual signal.

9. Electric clamping system for the position of a steering column according to claim 1, characterised in that the means for controlling are positioned close to a steering wheel.

10. Steering column comprising a supporting assembly to be fixed to a vehicle chassis and a body-tube movably mounted in the supporting assembly to enable manual adjustment of the position of the body-tube relative to the supporting assembly, characterised in that it comprises a clamping system according to claim 1.

* * * * *